Oct. 4, 1932.  J. N. KIEP  1,881,082
HYDRAULIC COUPLING
Filed July 11, 1931
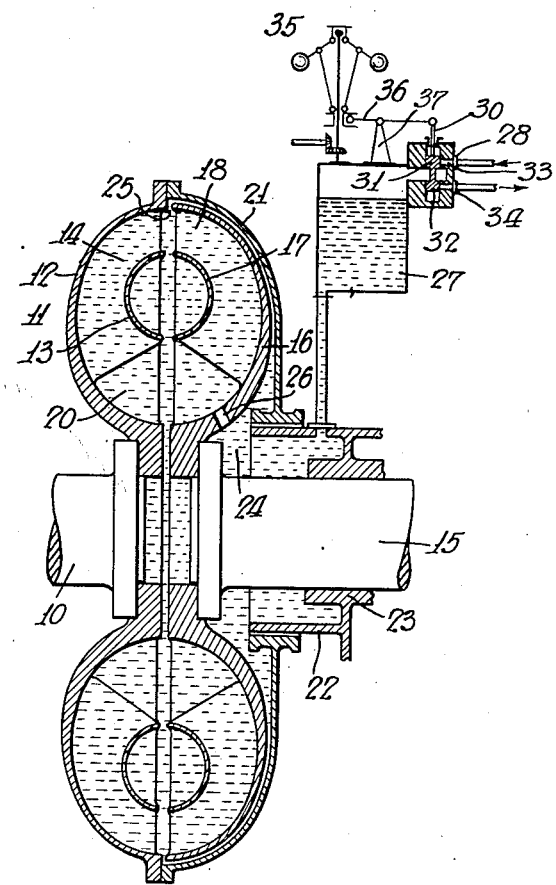
INVENTOR
Johann Nikolaus Kiep
BY
Dean, Fairbank, Hirsch & Foster
ATTORNEYS Patented Oct. 4, 1932

1,881,082

UNITED STATES PATENT OFFICE

JOHANN NIKOLAUS KIEP, OF ALTONA-HOCHKAMP, GERMANY

HYDRAULIC COUPLING

Application filed July 11, 1931, Serial No. 550,107, and in Germany November 14, 1930.

The invention relates to a hydraulic coupling of the Vulcan type in which a driving member and a driven member are so constructed and so juxtaposed as to form a liquid operating chamber in which the liquid may move in a vortex ring. The liquid in said chamber is impelled from the driving member into the driven member to drive said driven member and returned again to the driving member. These members are usually provided with guide rings disposed in the operating chamber and encircling or defining a core around which the impelling liquid circulates. Such a construction is shown and broadly claimed in the Föttinger Patent 1,199,359, issued Sept. 26, 1916.

In a hydraulic coupling of this type, a certain amount of air is entrained in the impelling fluid, and the degree of separation of this air from the liquid depends on the speed of circulation of the impelling liquid. When the coupling is running at a normal number of revolutions per minute and the slip between the driving and driven members is small, the speed of circulation of the impelling liquid in the operating chamber is correspondingly small. The result is that very little separation of the air takes place, so that the liquid substantially fills the space between the outer periphery of the core rings and the outer bounding wall of the operating chamber. Under these conditions, any air which is separated will be trapped in the interior of the core where the pressure is the lowest. The inherent slip characteristic of the coupling of the Vulcan type is such that when the speed of the driving shaft is reduced, the torque remaining the same, the slip between the driving and driven members of said coupling is increased. This increase in slip causes the impelling liquid in the operating chamber to circulate around the core at a greater speed, so that a more effective separation of the air from the circulating liquid takes place, the air forming a ring around the outer periphery of the core rings. This effects a condition in which the impelling fluid no longer completely fills the space between the core rings and the outer bounding walls of the operating chamber, causing thereby a corresponding decrease in efficiency of transmission. This condition is further accentuated by the tendency of the air which has collected in the core rings to combine with the air which has formed on the outer periphery thereof. Furthermore, the increased circulation of liquid around the core causes the formation of eddy currents.

One object of the present invention is to provide improved means for controlling the slip of a coupling by controlling the pressure in the coupling.

Another object of the present invention is to control the slip of a coupling by controlling the circulating speed of the liquid around the core which occurs at high slip. This feature may be advantageously applied for decreasing the circulating speed of the liquid. In this way, the separation of air from the driving liquid is decreased, the degree of incomplete filling of the operating chamber correspondingly decreased, and the formation of eddy currents reduced. By decreasing the circulating speed of the driving liquid, the drop in efficiency of transmission incident to the drop in the speed of the driving member, or the increase of the load, will be correspondingly decreased.

In a specific form of the invention, the pressure of the fluid in the operating chamber is varied in accordance with any operating conditions desired. For instance, if it is desired to increase the transmission efficiency of the coupling at low revolutions, an increase in pressure is effected which serves to force the layer or ring of air collecting around the core into the inside of the core rings, thereby filling the space between the outer periphery of said core rings and outer bounding wall of the operating chamber. This increase in pressure also effects a decrease in the circulating speed of the liquid, and in turn effects a corresponding increase of transmission efficiency.

Variations in the pressure of the impelling liquid may be effected in various ways. For instance, if a high speed is desired when the driving member is rotating at low speed and the driven member is stalled, then an increase in pressure may be effected just up to the point where a predetermined low number of revolutions has been reached.

In the accompanying drawing there is shown for purposes of illustration, a central longitudinal section through a coupling, having one form of device embodying the present invention.

In the coupling illustrated there is provided a driving shaft 10 having mounted thereon a driving member which includes an outer dished ring 12 and an inner dished ring 13 connected together by a series of impeller blades 14. Axially of the driving shaft 10 is a driven shaft 15 which has connected thereto a driven member which includes an outer dished member 16 and an inner dished member 17 joined together by an annular series of impeller blades 18. The driving and driven dished members 12 and 16 are juxtaposed to form therebetween a liquid operating chamber 20, and the dished members 13 and 17 cooperate to form a core ring around which the impelling fluid circulates. Connected to the dished member 12 is a shell member 21 extending in close proximity to the dished member 16 and forming a protective casing therefor. The member 21 has a flange portion which embraces a stationary sleeve 22 encircling the shaft 15 and having a bearing portion 23 for supporting said shaft. The interior of said sleeve 22 forms a portion of a chamber 24 which communicates with the interior of the liquid operating chamber through an annular space 25 between the two members 12 and 16 and ports 26 in the dished member 16.

If the coupling is of a type in which the operating chamber is being continuously filled and discharged, the variation in pressure of the impelling liquid may be effected by varying the pressure of the filling pump. If the coupling is of a constant liquid type, it is advantageous to provide a pressure liquid tank. For that purpose, in the specific construction shown, the sleeve 22 is provided with a suitable conduit communicating with a pressure chamber 27 which is partially filled with liquid. This chamber 27 is sealed, and the air chamber thereof is provided with a valve 28 which may be controlled automatically or by hand. This valve, in the specific form shown, includes a slide valve member 30 having enlarged portions 31 and 32 cooperating with two ports 33 and 34 respectively to open one of said ports while closing the other. The port 33 is connected to a suitable source of gas pressure and the port 34 may be opened to the atmosphere or to a vacuum chamber. By shifting the valve member 30, either of the ports 33 or 34 will be open to selectively vary the pressure in the air chamber of the reservoir 27.

If it is desired to control the pressure of the liquid in accordance with the speed of the driving member, a centrifugal governor 35 may be provided having a pivoted connection to one end of a rod 36 which is intermediately pivoted to a bracket 37, the other end of said rod being pivotally connected to the slide member 30. As the speed of the driving member is decreased the flyball of the governor will cause the slide valve 30 to rise, so as to open the port 33 and close the port 34. As the speed increases, the governor lowers the slide valve so as to open the port 34 and close the port 33. This variation of pressure in the air chamber of the reservoir will be transmitted to the impelling liquid in the working chamber of the coupling, causing the liquid to entirely fill said coupling, and also forcing the entrained air towards the center of the core, as already discussed.

Having thus described my invention, what I claim as new and desire to secure by Letters Patent is:

1. A hydraulic coupling, including a driving member, a driven member, said members including a liquid operating chamber therebetween, a stationary liquid tank having communication with the interior of said operating chamber, and means actuated in accordance with the speed of one of said members for varying the pressure in said liquid tank, whereby the pressure of the liquid in the operating chamber is correspondingly varied.

2. A hydraulic coupling, including a driving member, a driven member, said members including a liquid operating chamber therebetween, a stationary liquid tank having communication with the interior of said operating chamber, a pressure gas supply conduit connected to said tank, and a gas outlet conduit from said tank, and valve mechanism for operating said valve to control the gas pressure in said tank above the liquid therein and thereby control the separation of gas from the liquid in the working chamber.

Signed at Hamburg, Germany this 24th day of June A. D. 1931.

JOHANN NIKOLAUS KIEP.